US007925281B2

(12) United States Patent
Cahn

(10) Patent No.: US 7,925,281 B2
(45) Date of Patent: *Apr. 12, 2011

(54) METHODS FOR OPTIMIZING AND EVALUATING NETWORK ACCESS TECHNIQUES

(75) Inventor: Robert Cahn, Carmel, NY (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/387,262

(22) Filed: Apr. 30, 2009

(65) Prior Publication Data
US 2009/0213739 A1 Aug. 27, 2009

Related U.S. Application Data

(63) Continuation of application No. 11/357,667, filed on Feb. 17, 2006, now Pat. No. 7,558,211, which is a continuation of application No. 09/909,123, filed on Jul. 19, 2001, now Pat. No. 7,035,222.

(51) Int. Cl.
H04W 68/00 (2009.01)
H04W 24/00 (2009.01)

(52) U.S. Cl. ........ 455/458; 455/425; 455/423; 455/424; 370/241; 370/250

(58) Field of Classification Search .................. 455/458, 455/423–425; 370/241, 250
See application file for complete search history.

(56) References Cited

U.S. PATENT DOCUMENTS
7,558,211 B2 * 7/2009 Cahn ............................ 370/241
* cited by examiner Primary Examiner — Charles N Appiah
Assistant Examiner — Emem Stephen

(57) ABSTRACT

Methods of evaluating access to Virtual Private Networks (VPNs) from alternate access connections and for improving access to VPNs from alternate access connections such as ISPs. The methods include downloading a set of tests through a network backbone to simulate access to the VPN from the alternate access connection and comparing the results of the test to benchmarks for the test of access to the VPN from leased lines and modems. By obtaining comparisons of the tests and the benchmarks, it is possible to determine the throughput of data through the VPN and tell the customer how its access connections are affecting, among other things, the raw data throughput. This allows the customer and/or the network service provider to adjust the access connections to improve communications with the VPN.

12 Claims, 4 Drawing Sheets

FIG. 4

|  | ALTERNATE ACCESS | 56 KBPS ACCESS | 512 KBPS ACCESS | T1 ACCESS |
|---|---|---|---|---|
| RAW THRUPUT | 33KBPS/41KBPS | 48KBBP/51KBPS | 415KBPS/433K | 1.24M/1.37M |
| INTRANET | 20/420/180 | 90/200/160 | 30/95/45 | 12/22/17 |
| PROCESSING | 1200/8000*/3200 | 1500/5500/2500 | 600/1300/950 | 300/390/330 |
| MAIL | 600/770/660 | 550/630/520 | 215/240/223 | 90/115/101 |
| SAP | 12K/25K*/19K | 11K/21K/17K | 8K/15K/12K | 4K/6K/5K |
| VOLP | 44/80/51 | 52/57/55 | 27/29/28 | 18/18/18 |

FIG. 5

| DATE | THRUPUT |
|---|---|
| SEPTEMBER 15 | 33KBPS/41KBPS |
| SEPTEMBER 20 | 32KBPS/41.5KBPS |
| SEPTEMBER 25 | 33.5KBPS/41.5KBPS |
| SEPTEMBER 30 | 32.5KBPS/40.5KBPS |
| OCTOBER 5 | 18KBPS/13KBPS |

METHODS FOR OPTIMIZING AND EVALUATING NETWORK ACCESS TECHNIQUES

CROSS REFERENCE TO RELATED APPLICATIONS

This is a continuation of application Ser. No. 11/357,667, filed Feb. 17, 2006, entitled "Methods For Optimizing And Evaluating Network Access Techniques", which issued as U.S. Pat. No. 7,558,211 on Jul. 07, 2009, which was a continuation of application Ser. No. 09/909,123, filed Jul. 19, 2001, entitled "Methods For Optimizing And Evaluating Network Access Techniques", which issued as U.S. Pat. No. 7,035,222 on Apr. 25, 2006.

FIELD OF THE INVENTION

This invention relates to methods for evaluating different network access arrangements by testing access connections and comparing the test results against benchmarks for the tested connections that would be implemented on various types or leased lines. More specifically, the invention relates to methods of improving network access when there is a mixture of access technologies available to users of the network.

DESCRIPTION OF THE RELATED ART

The demand for telecommunications services has mushroomed over the last few years. Many types of networks now exist through which data, voice, video and other multimedia applications can be routed and switched. Many forms of data and applications may be downloaded through such networks, such as Internet and Intranet web page fetches, form processing, mail fetches, supply chain and HR transactions, for example Service Access Point (SAP) transactions and PeopleSoft transactions, queries to Internet servers, voice over IP (VoIP), and other applications.

Virtual private networks (VPNs) have typically been created which allow customers or users of the network to obtain efficient use of the network resources, and cheaper service costs for data and other services. A VPN is typically set up with a series of leased lines or permanent virtual circuits (PVCs) that interconnect with a local public switched telephone network (PSTN) to provide the aforementioned cost savings, efficiency and enhanced usability of services. The backbone for typical VPNs is a wide area network (WAN), local area network (LAN), or other forms of private or shared-private networks. Typically, data customers of a VPN have connected to the VPN through a leased line or a modem.

The future development of VPN access technology will require that network owners and service providers provide access to the VPN by whatever connection the user or customer has at its disposal. Thus, connecting to the VPN from the customers' Internet Service Provider (ISP) or through the Internet itself will be a primary modality by which a VPN is accessed. Customers will therefore connect to their VPNs using IPsec tunneling. In point of fact, the VPN may be accessed by the customer through a mix of access technologies such as IPsec (IP security), which is a collection of security measures for IP tunneling, digital subscriber lines (DSL), modems and leased lines. Thus, the VPNs of the future will require access management and evaluation that cuts across a variety of access technologies. This will provide new and unforeseen problems with network management since DSL, IPsec tunneling and other forms of private access to networks are not in the control of the network or service providers and therefore cannot be easily monitored or characterized.

Currently, there exists diagnostic equipment for networks that can report the network data carrying characteristics such as throughput, for example. However, these current diagnostic tools require that the VPN be established in the network and running before any information can be gathered with the diagnostic tools. This does not provide any predictive capability to the network and cannot tell network designers or service providers which access connections will be the best performers for the particular services that the customer wishes the VPN to perform. These current tools therefore do not provide adequate methods for assessing VPN access concerns.

There thus exists a long-felt need in the art for methods of characterizing, evaluating and/or optimizing network access from a variety of sources. These methods should be designed to fully understand the issues of data management and throughput when customers access their VPNs from a variety of access points and technologies. Moreover, the methods should allow the network and service providers to be able to make recommendations to customers concerning the access technology to utilize, and to modify the access technologies and the access to the VPN in order to improve and/or optimize access thereto. Such results have not heretofore been achieved in the art.

SUMMARY OF THE INVENTION

The aforementioned problems are solved, and long-felt needs met, by methods of evaluating and improving network access from alternate access connections to VPNs provided in accordance with the present invention. The methods preferably comprise downloading a test through a network backbone to a network that will produce a VPN for a user to simulate interactions with the VPN and the alternate access connection. Results of the test that has been downloaded are compared to benchmarks for the test that could be run through a set of access connections to the backbone from other than an alternate access connection. In a preferred embodiment results of the comparison are then reported.

Even more preferably, the present methods improve access to a VPN by simulating interactions with the VPN and adjusting access to the VPN as a result of the simulations. Advantageously, the inventive methods allow VPN managers and service providers to assess the performance of a customer's VPN before the VPN is created, thereby allowing the VPN provider to predict the VPN's performance given the network connections that will come into play, and to adjust the network connections. This also allows the VPN provider to advise the customer of the better or best access connections to use.

The methods of the present invention thus allow network designers and providers to improve data throughput in a VPN and to greatly increase the efficiency of the VPN for a customer. Moreover, the present methods allow the VPN provider to inform customers regarding the performance to their VPN and to advise customers of the type of services that should be accessed through a private service to the VPN as opposed to access to the VPN through some other type of access connection, for example, a leased line (T1, T3, etc.), or a modem. Such results have not heretofore been achieved in the art.

These and other features of the present invention will become apparent from the following detailed description considered in conjunction with the accompanying drawings which are first described briefly below. It is to be understood, however, that the drawings are designed solely for purposes of illustration and not as a definition of the limits of the invention, for which reference should be made to the appended claims.

BRIEF DESCRIPTION OF THE DRAWINGS

In the drawings wherein like reference numerals refer to like elements throughout the several views thereof:

FIG. 2 depicts a network having a backbone through which VPNs may be established with access connections that include alternate access connections and servers such as Internet Service Providers (ISPs), as well as leased lines, modems, DSL connections and the like;

FIG. 4 depicts a table that embodies a report of tests or simulations provided in accordance with the present invention;

FIG. 5 depicts a table that embodies a report of retesting of alternate access connections to a VPN provided in accordance with the present invention.

DETAILED DESCRIPTION OF THE PREFERRED EMBODIMENTS

Figure 1:
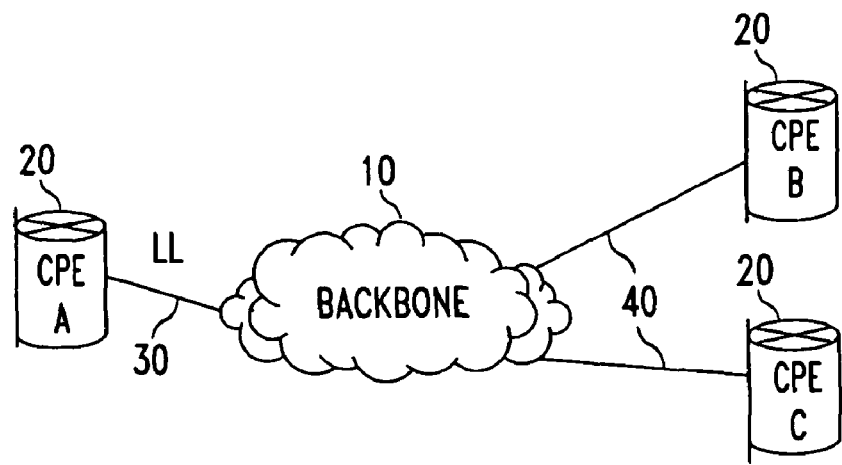
FIG. 1 depicts a prior art network having a backbone through which VPNs have been established through leased lines and/or modems.

Referring now to the drawings, FIG. 1 depicts a prior art network for establishing VPNs that contains a backbone 10, for example a WAN, LAN or other appropriate media to establish connectivity for customers. A plurality of customer premises equipment (CPE) 20 exist at locations remote from each other and are operable to establish connections with the VPN so that services can be provided to the customers having access from the different CPEs 20. In the past, the connectivity has been established exclusively through leased lines (LL) 30 and/or modem connections 40.

Figure 2:
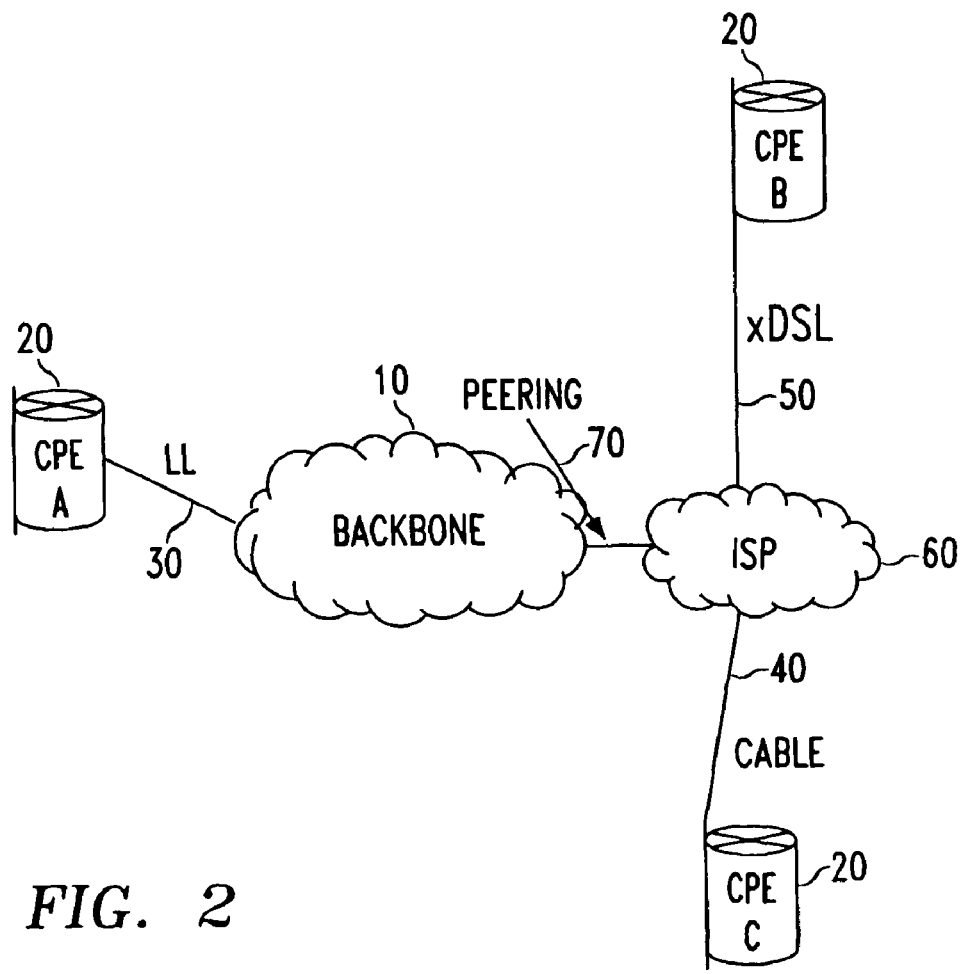

FIG. 2 depicts a new configuration for establishing VPNs which will become prevalent in the art as ISPs more and more take over data and voice service provisioning. For example, CPEs 20 may communicate with the backbone 10 through a LL 30 or a modem as has been done in the past. Moreover, CPE 20 may communicate with the backbone over broadband or cable connections 40 or DSL connections 50. In this case, the CPE 20 will likely first encounter an ISP 60 which introduces a new dynamic to the provisioning process as well as the interaction and set-up of the customer's VPN. This arrangement will produce the need for the ISP 60 to establish a peered connection 70 with the backbone 10 in order for the VPN to be established, remain active and function properly. Such a situation introduces new issues to the network's performance which heretofore have not been quantified or well understood. This is particularly the case since the ISP 60 is out of the control of the network provider.

Figure 3:
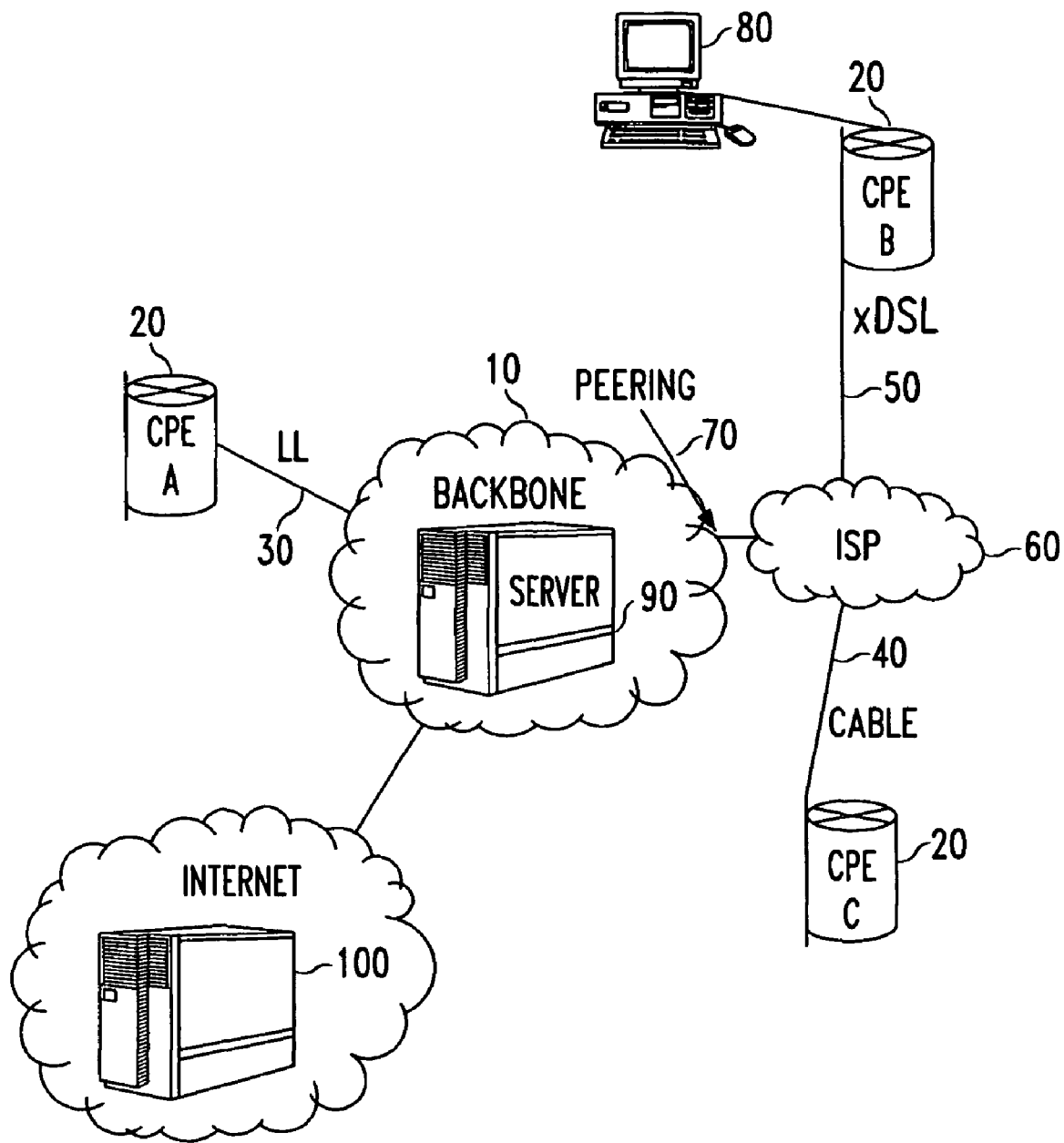
FIG. 3 is a block diagram of a system for testing VPNs in accordance with the methods of the present invention.

Referring now to FIG. 3, a system to aid in quantifying the network characteristics for the hybrid access system of FIG. 2 is depicted. A computer 80 is interfaced to the network and is operable to download to the network a script or client that contains one or more tests that will simulate access to a customer's VPN. It will be appreciated by those skilled in the art that computer 80 could be a server, personal computer, laptop computer, personal digital assistant (PDA) or any other computing device that is adapted or adaptable to interface through the appropriate communication protocol with the network.

The tests downloaded by computer 80 will simulate interactions with private servers or ISPs 60 connected to the VPN backbone 10 and a server 90 associated with VPN backbone 10. Many types of tests may be downloaded. For example, but not intending to limit the invention in any way, the tests may include and simulate one or a combination of Intranet web page fetches, Intranet form processing, Mail fetches, supply chain and HR transactions, for example SAP transactions and PeopleSoft transactions, queries to Internet servers (for example the server 100 shown in FIG. 3) and VoIP, among others. It will be further appreciated by those with skill in the art that the set of tests is expandable and can include any other network enabled software processes that the customer might be interested in running on their network.

In accordance with the invention, at the same time that the test(s) are being downloaded and run through the network, a set of benchmarks for the same set of queries embodied by the test(s) run on leased lines is preferably accessed for comparisons to the results of the access to the VPN achieved by the test(s). This results in a substantive comparison of access to the VPN through network backbone 10 from an alternate access server or server by the test(s) against the access achieved purely through the benchmarks associated with the well-understood and defined leased lines. This information might then be provided to customers of the VPNs so that they may understand the relative benefits of different types of access connections to their VPNs. Moreover, since oftentimes a customer will complain to the network provider regarding slow or otherwise inadequate access to the VPN, the results of such comparisons will give the network provider the ammunition it needs to explain the problems to the customers and to perhaps elucidate that it is the customer's alternate server access connections that are causing the issues extant with current access speeds. These options have not heretofore been available to network providers in the past.

Since it may be desirable to provide reports of the comparisons made, formatting and presentation of the reports will be important in understanding them. FIG. 4 is an example of a hypothetical report or table of the comparisons made in accordance with certain of the methods of the present invention. As can be seen, the alternate access (private server access) connection speeds to the VPN are compared to 56 Kbps, 512 Kbps and T1 access speeds for various applications. In the current example of FIG. 4, raw throughput gives the maximum sustained flows into and out of the network. In some cases, transactions could not be completed at all; these are denoted with an *. As will be observed, different tests produce different times to complete the application for multiple attempts, usually three in all.

The results of the tests may lead to several conclusions for the customer. For example, the customer may have purchased a 1 Mbps SDSL line, but testing as described above shows that the behavior of the line in the VPN will be closer to a 56 kbps link than any other connection. The customer may be very unhappy with the performance of their expensive, high bandwidth line and so testing in accordance with the present invention will show the customer why the high-speed line performs so poorly, and will create a paradigm for devising possible remedies to the problem. These possibilities have not heretofore existed or been available in the art.

Another use of the methods of the present invention is periodic retesting of alternate access to the system, particularly from private servers such as ISPs. One way to focus on retesting for any type of access connection is to observe raw throughput data to determine the performance of the VPN with different access connections. FIG. 5 is a table of raw throughput data to judge performance at different times of the year. By examining the table of FIG. 5, it can be observed that something occurred at the end of September or the beginning of October that had a serious impact on the throughput, that is, the maximum and minimum throughputs decreased significantly. Why this occurred is unclear, and may be unknowable without further analysis. However, one might infer that if other customers entering their VPNs at the same access point to the backbone show no significant changes to the throughput, then the problem probably lies further out and the VPN provider or customer can initiate action with other networks or providers to attempt to solve this problem. This capability in and of itself provides a tremendous diagnostic advantage over current methods of diagnosing network throughput problems, and greatly enhances the efficiencies of the network employing the inventive methods. Moreover, this allows the network owner and/or VPN provider to serve its customers better, thereby greatly increasing the probability that these customers will be satisfied and retained. Again, these salutary effects have not heretofore been achieved in the art.

Yet other aspects of the present invention allow adjustments to network access connections to be made by a customer in light of the tests and comparisons made and described herein. These methods will allow network providers and/or customers to adjust access to the VPN through several methods, including, but not limited to, choosing a new access connection or adjusting hardware and/or software functionality within existing connections to improve access to the VPN. This may allow for a measurable increase in performance of the VPN which the customer and/or the network provider could measure to make the adjustments. Such methods may be programmed in software with an appropriate software language such as C++, UNIX, VISUALBASIC, JAVA, HTML, XML, WML, or any other high level, preferably object oriented language.

Figure 6:
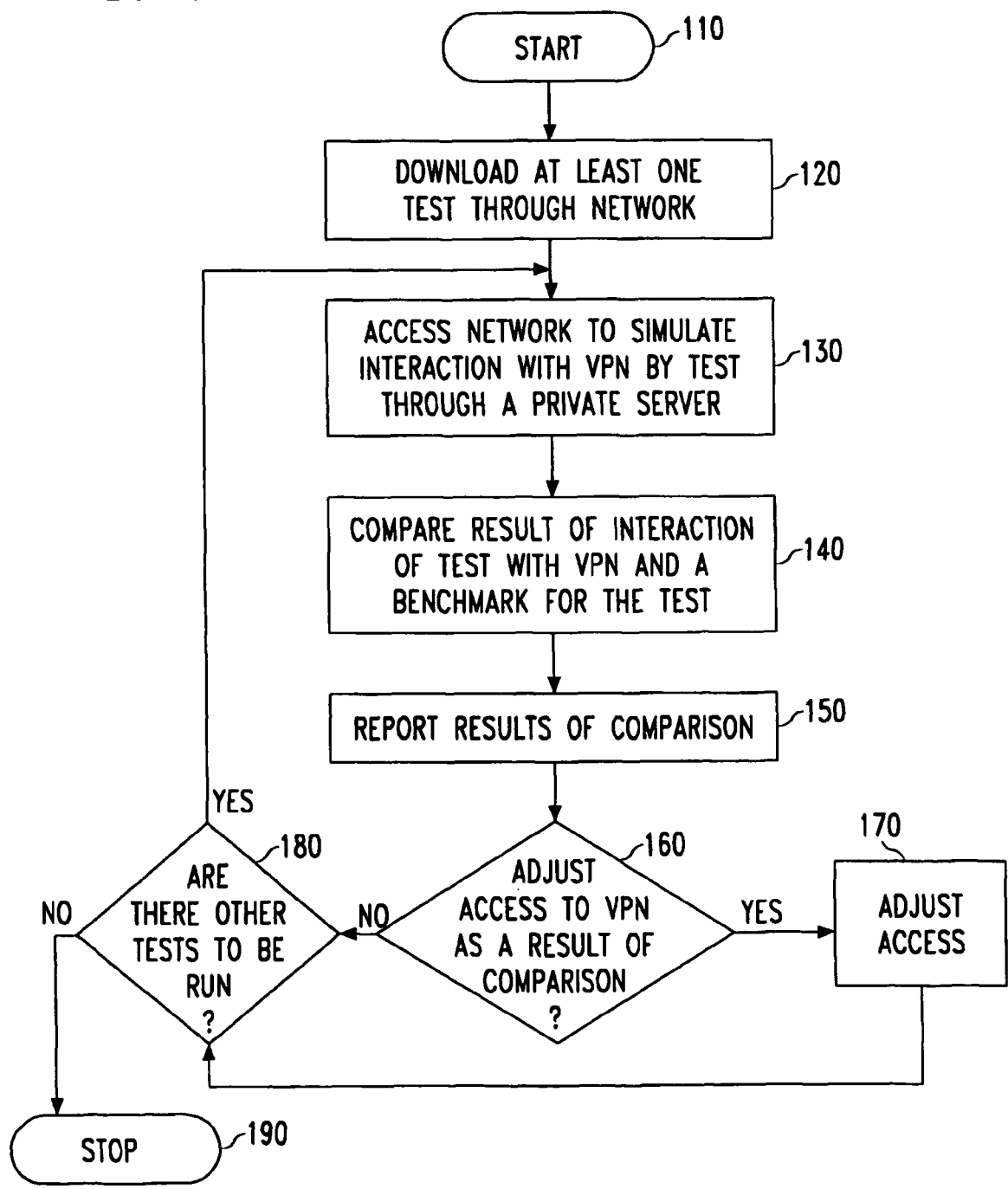
FIG. 6 is a flow diagram of a preferred embodiment of methods of the present invention that may be programmed in software.

Whichever language is chosen in which to write and design the software, FIG. 6 is a flow chart of an illustrative embodiment of the inventive methods. The methods begin at step 110, and at step 120 at least one test is downloaded through the network to simulate access to the VPN. At step 130, the network is accessed by the test to simulate interactions with the VPN through a private server, and at step 140 comparisons are made of the results of the test with a benchmark for the interactions over leased lines. Optionally, at step 150 the results of the comparison may be reported in the form of the tables of FIGS. 4 and 5, or otherwise, to the customers, network providers, or other appropriate individuals or entities that would have an interest in the results.

It is then preferably determined at step 160 whether adjustments of the access to the VPNs should be made as a result of the aforementioned comparisons. If so, then at step 170 the adjustments are made, for example, a new access connection is chosen or the access connection software and/or hardware is modified to improve the connection. It will be appreciated by those skilled in the art that other adjustments may be made depending on the types of connections available to access the VPN and the hardware and/or software used by the private server, ISP or other providers of the leased lines. If it is not desired to make adjustments, then at step 180 it is preferably determined whether there are other or additional tests that should be run to further characterize and/or improve the access connections to the VPN. If so, then the method reverts to step 130. If not, the method stops at step 190.

Thus the methods of the present invention provide network designers and providers with the ability to improve data throughput in a VPN and to greatly increase the efficiency of the VPN for a customer. Moreover, these methods allow the VPN provider to inform customers regarding the performance to their VPN and to advise customers of the type of services that should be accessed through a private provider to the VPN as opposed to access to the VPN through some other type of access connection, for example, a leased line (T1, T3, etc.), or a modem. These results have not heretofore been achieved in the art.

While there have been shown and described and pointed out certain novel features of the present invention as applied to preferred embodiments thereof, it will be understood by those skilled in the art that various omissions and substitutions and changes in the methods and apparatus described herein, and in their operation, may be made by those skilled in the art without departing from the spirit and scope of the invention. It is expressly intended that all combinations of those elements and/or method steps which perform substantially the same function in substantially the same way to achieve the same results are within the scope of the invention. Substitutions of method steps and elements from one described embodiment to another are also fully intended and contemplated. It is the intention, therefore, to be limited only as indicated by the scope of the claims appended hereto.

What is claimed is:

1. A method for evaluating the performance of a customer's virtual private network (VPN) network access arrangements from an Internet Service Provider (ISP) access connection, comprising the steps of:
   downloading a test through a network to a VPN that has been created and is being used by customers that will simulate interactions with the VPN and the ISP access connection;
   measuring the data-carrying performance of the VPN in the test with respect to the ISP access connection;
   comparing the performance results of the test with respect to the ISP access connection to benchmarks for the test with respect to one or more access connections to the VPN from other than the ISP access connection; and
   reporting the results of the comparison to a recipient selected from (a) a customer of the VPN and (b) a provider of the VPN.

2. The method recited in claim 1, wherein the step of measuring the data-carrying performance of the VPN further comprises the step of retesting the VPN at different times to characterize data throughput for the ISP access connection.

3. The method recited in claim 1, further comprising the step of adjusting access to the VPN as a result of the comparison.

4. The method recited in claim 1, wherein the comparing step comprises the step of comparing the results of the test to a benchmark for access connections that is a leased line.

5. The method recited in claim 1, wherein the test is downloaded to the VPN through the ISP and access means to the ISP are selected from a broadband cable, a DSL line, and a modem.

6. A method for improving data throughput in a virtual private network (VPN) that has been created and is being used by customers, comprising the steps of:
   simulating interactions with the VPN from access by a first access connection by downloading a test through a network to the customer's VPN, measuring the data-carrying performance of the VPN with the first access connection, and comparing results of the test with a benchmark for the test that would have connected to the VPN through an access connection other than the first access connection;

providing the results of the comparison to customers of the VPN; and adjusting access to the customer's VPN as a result of the comparison to an access arrangement providing improved data throughput.

7. The method recited in claim 6, wherein the simulating interactions step comprises the steps of:

downloading the test through a network backbone to the VPN; and comparing results of the test that has been downloaded to a plurality of benchmarks for the test run on a set of access connections to the backbone from other than the first access connection.

8. The method recited in claim 6 wherein the first access connection is through a private server not controlled by the provider of the VPN.

9. The method recited in claim 8 wherein the private server is part of an Internet Service Provider (ISP) service.

10. The method recited in claim 8 wherein the test is downloaded to the VPN through the private server and access means to the private server are selected from a broadband cable, a DSL line, and a modem.

11. The method recited in claim 6, wherein the step of measuring the data-carrying performance of the VPN comprises the step of retesting the VPN at different times to characterize data throughput.

12. The method recited in claim 6, wherein the comparing step comprises the step of comparing the results of the test to a benchmark for access connection that is a leased line.

* * * * *